Patented Oct. 13, 1953

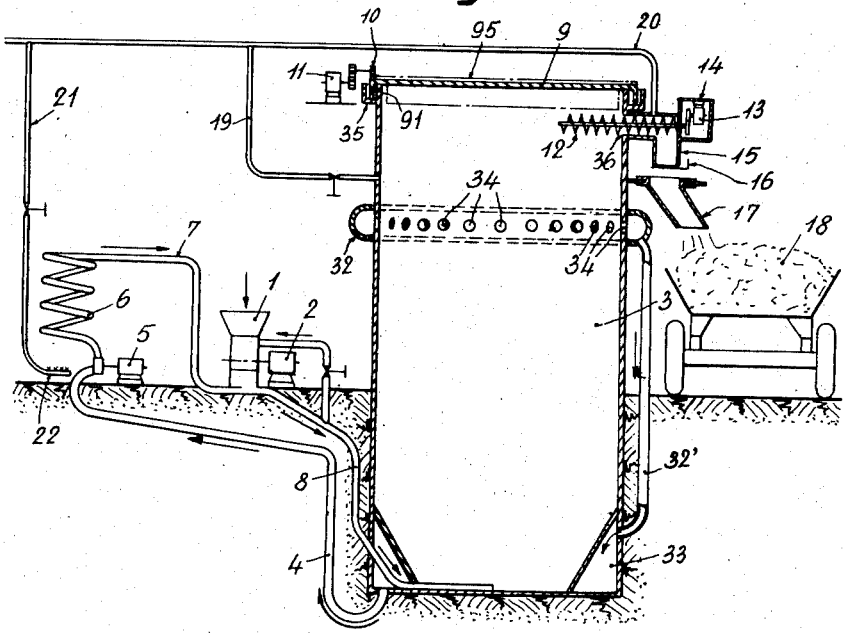

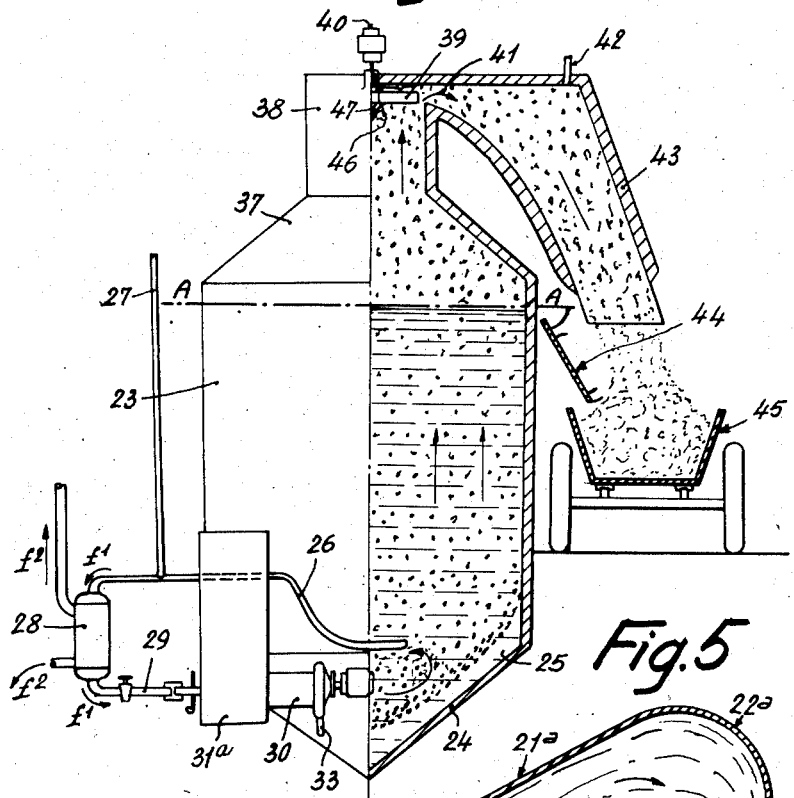
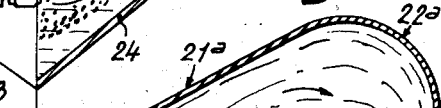
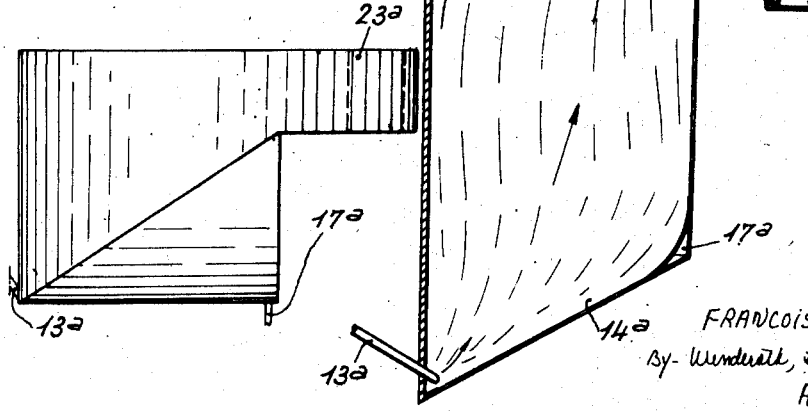

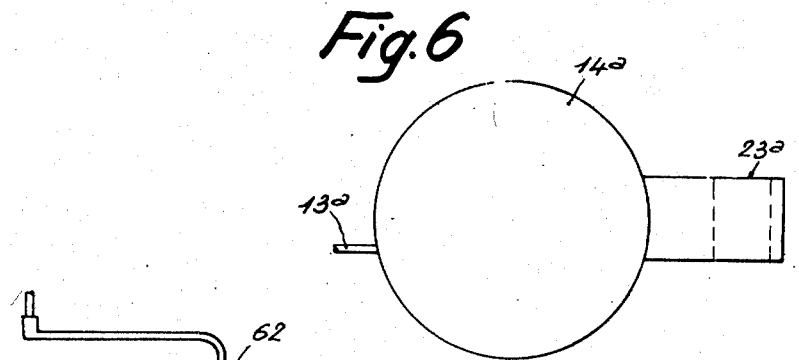
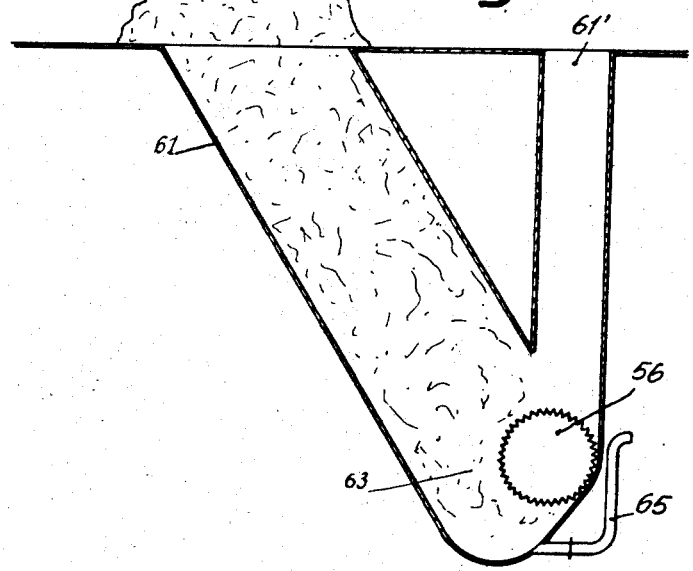
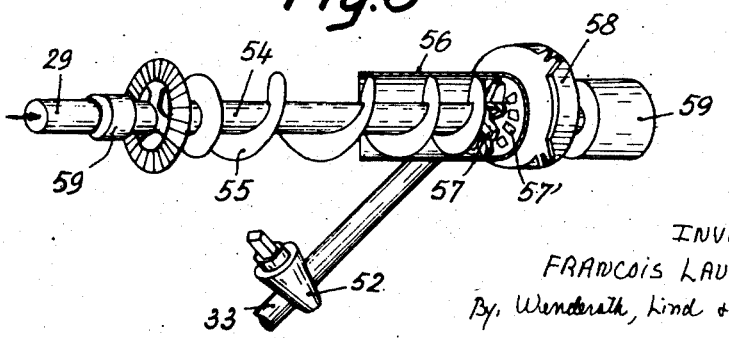

2,655,434

UNITED STATES PATENT OFFICE 2,655,434

APPARATUS FOR THE CONTINUOUS FERMENTATION OF PULVERIZED VEGETABLE PRODUCTS

François Laurenty, Loos-les-Lille, France

Application March 29, 1950, Serial No. 152,586
In France March 31, 1949

4 Claims. (Cl. 23—259.1)

It has been regarded as standard practice and utilised in various forms of equipment to complete the fermentation of chopped vegetable products for the production of decomposition products of the vegetable material fermented by stirring the vegetables in vats, these pulverized vegetable products remaining suspended in the liquid manure product. Up to now, however, practical difficulties have been encountered with the existing apparatus. A completely satisfactory solution of these difficulties has not heretofore been found. It has been necessary to modify the existing apparatus with comparatively intricate mechanical equipment, for routing the materials into the vats and then to arrange the discharge when the process of fermentation has been completed.

An object of the present invention is to construct an apparatus for the continuous fermentation of solid pulverized vegetable products to produce a fertitlizer residue, and fermentation combustion gas, wherein a mixing device proportions and stirs the fermentable vegetable products and liquid manure in the anaerobic fermentation vat and wherein feeding means supply the vegetable liquid manure product from the mixing device into the lower portion of the fermentation vat, withdrawal means being provided at the upper part of the fermentation vat located above the liquid level of the vat, to provide recovery of the fermentation gases through an outlet pipe to the vat and to remove the fermented solid manure products through an evacuation chute at the bottom of the vat. The fermented solid in the apparatus of the invention is continuously displaced to the top of the fermentation vat by the upwardly directed force of the gas bubbles formed in fermentation.

The distinctively novel mixing action obtained in the apparatus of the invention is based on the fact, during the anaerobic fermentation, that the gas bubbles that are generated remain for a certain time, clinging to the vegetable fragments and there is a tendency for these to rise up into the liquid portion of the mass. Accordingly, the invention lies in bringing in from down below into the fermenting vat or vats, the vegetable matter in the liquid decomposition product, while the matter has a natural tendency to rise on account of the lifting force that is promoted by the action of the bubbles; and in discharging the product constituted in the upper portion of the vat, by making use of this continuous rising action of the materials. The steps of "bringing in at the lower portion" and "discharging in the upper portion" are understood here in their widest sense; between these two points the paths travelled by the materials will not of necessity follow a vertical line; it may be directed along a sloping route, provided it is a generally rising course.

Under these conditions, the degree of fermentation of the product undergoing treatment is farther advanced as it reaches a higher level in the vat.

Further, the apparatus is fitted out so that the liquid manure level in the vat is kept at a certain height above the top of the vat; the lifting power of the vegetable matter undergoing treatment is enough, as demonstrated by the experimental work of the inventor, to raise a thick formation of vegetable material, already converted into a decomposition product, above the level of the liquid, which enables its ready withdrawal from the upper portion of the vat, after the product is drained off above the level of the liquid.

Other features of the invention appear from the description hereinbelow and the drawings illustrating the several modifications of execution of the invention, and the examples. In the drawings:

Figure 1 is a vertical section through the axis of a first modification; and Figure 2 is a corresponding diagrammatic view, from below the lid of the outfit;

Figure 3 is a diagrammatic view in half elevation and half-vertical axial section of a second modification.

Figure 4 is a plan diagrammatic view of a third modification.

Figures 5 and 6 are diagrammatic views respectively in axial vertical section and in plan of another modification.

Figures 7 and 8 deal with arrangements in regard to the preparation of the material in view of bringing it into the fermenting vat properly so called, Figure 7 being a diagrammatic assembly view and Figure 8 a view in perspective of a chopping-up and mixing device.

In the case of the modification shown in Figure 1, the product to be treated is cut into small pieces in the chopper that is worked by the motor 2. The decomposition product, coming from the fermenting vat 3 through the piping 4 and pressed by the motor 5 into a reheating coil 6 is sent under pressure through the piping 7 into the lower portion of the chopper 1 in order to draw the chopped straw through the piping 8 to the lower portion of the fermenting vat 3. This vat shows an outer cylindrical wall 31a and one or several hollow sheaths 32 that connect up on the one hand with the inside of the vat 3 through holes 34 and on the other hand with an annular chamber 33 located at the lower portion through piping 32'. The chamber 33 connects up through the piping 4 with a coil 6, while the inlet piping for the straw flows out into the vat 3. The decomposition product, present in the vat, flows out through the holes 34 and the piping 32' into the chamber 33. The top of the vat 3 is closed by a lid 9, of which one view from below has been shown Figure 2. This lid 9 constitutes a hydraulic joint and carries for this purpose on its lower surface a ring 91 that goes into a groove 35 of the vat 3. On its upper surface, this lid 9 carries a circular teething 95, that engages with a toothed pinion 10, that is driven by a motor 11. The turning motion of the latter causes therefore the turning of the lid 9. On its lower face, as may be seen in Figure 2, this lid 9 carries central paddles 92, that push forward the decomposition product towards the periphery, intermediate paddles 93 that pick up the decomposition product pushed back by the paddles 92 and peripheral paddles 94 that complete the pushing back of the decomposition products towards the periphery of the vat 3. The vat 3 carries on its side wall a little below the paddles 92, 93, 94 an opening 36 through which passes a spiral conveyor 12, started up in rotation without axial change of position by a motor 13. The portion of the conveyor outside the vat 3 and the motor 13 are located in a casing 14, that shows a fixed chute 15. The latter may be closed by a slide 16 intended to avoid air from coming in.

Below this chute 15 is arranged another chute 17, that brings the decomposition product falling from the chute 15 into a truck 18. The gases generated through the fermenting in the vat 3 are collected through piping 19 and those existing in the casing 14 are discharged through piping 20. These pipings 19 and 20 are extended by piping 21 bringing the gases to a burner intended for heating the coil 6 or for a vat that is not shown.

The following explanation will give the working of the outfit as disclosed above:

The chopped up straw drawn by the liquid manure is sent through the piping 8 into the lower section of the central portion of the vat 3.

This inlet of chopped vegetable matter into the bottom of the vat has the tendency of pushing upwards the vegetable matter that is there already and has begun its fermenting process; but its action above all is exerted in the same direction as the lifting power accruing from the gas bubbles that are generated and remain stuck to the vegetable particles. There is a resultant progressive movement of the whole mass producing fermentation. On the other hand, progressively as the straw rises in the central portion of the vat 3, there is an increase in the degree of fermentation.

The material inlet through the bottom of the vat is adjusted under these conditions so that the fermentation is of a suitable degree when the material reaches the upper portion of the vat.

With the liquid decomposition product flowing through the holes 34 or any similar form of overflow, the decomposition product is raised continuously while draining until it reaches the arranged conditions, for the purpose of draining it, that are located in the close neighborhood of the lid. At that point, it is drawn by the paddles 92, 93, 94 towards the periphery and taken by the endless wormgear that discharges it through the passage 15.

In the modification shown in Fig. 3, the vat takes likewise the vegetable material to be treated through the bottom of the vat. The latter is a single wall 24; it has a conical-shaped bottom and continues on through a vertical cylindrical portion 23.

In the lower portion emerges the inlet 33 of the material to be treated that has been mixed with liquid decomposition product in the mixer 30 fed by a tank 31 of chopped straw or similar vegetable product. This inlet is headed so as to cause as violent a rotary motion as possible of the liquid contained in the vat, a rotary movement that precedes the raising of the materials treated.

On this account, the material is distributed inside the vat appreciably according to a cone with its tip downwards, and has a progressive rising movement, progressively as the fermenting carries on.

The distribution of the material floating in the liquid manure leaves areas available where there is solely liquid existing, specially in recesses or corners, such as 25, that are furnished with baffle-plates or suitable filter walls.

From this area 25 a pipe 26 is fitted for drainage of liquid decomposition product, this pipe being furnished with a gauge-pipe 27 that enables continual supervision to be obtained for the height of the liquid in the vat. This piping 26 leads for instance, in the direction of the arrows F, the liquid manure into a reheater 28, traversed by a heating fluid in the direction $F_2$ or reheated by other means, for instance with gas or by making use of waste heat, and through a piping 29 into the mixer 30.

In its upper portion, the vat is provided with a conical portion 37 of which the angle is sufficiently acute so that the materials circulate readily therein but not too sharp to place any restriction on clearance. This conical portion is continued through a dome portion 38 in the upper portion of which is an oblique paddle-wheel 39 driven by a small motor 40, and playing a part similar to the paddles 92, 93, 94 of the previous modification for the discharge of the decomposition product. On the side of the vat is a port 41 leading to a discharge sleeve, for instance in the shape of a hopper 43, in the upper part of which is provided the discharge port 42 of the gas generated. The hopper 43 is closed by a valve 44 or similar structure, that may, in case of necessity, be combined with any device intended to prevent any inopportune air coming in.

In order to improve the conditions under which the manure made up is to be drawn by the paddle-wheel, the latter may be provided at its lower portion with a spiral screw 46 set on a baffle-plate with revolving surface 47 intended to direct and draw the manure towards the paddles 48.

The working of this arrangement is substantially the same as that forming the object of Figures 1 and 2. The mixture of material and liquid manure brought in through the opening 33 rises while causing progressive fermentation owing to the action of bubbles of gas generated, the liquid decomposition product not going beyond the level AA and furthermore in practice it drips below the latter while continuing its raising movement and is drawn off through the hopper 43.

In the modification illustrated in Figures 5 and 6, the principle of circulation is the same, but all the mechanical withdrawal means may be omitted or simplified. The vat is provided with two sloped heads 14a and 21a and there is a swan-neck discharge for the manure; these latter features are sufficient to enable circulation to go on continuously.

As in the case of Figures 2 and 3 the removal of liquid manure takes place in an area 17a forming a recess.

As a driving agent simplifying the changes in position of material in angles, the worm-shaped vibrations produced in suitably arranged rubber tubes may be employed, by letting therethrough a large supply of liquid manure or of water under pressure.

In all the cases as contemplated, so far, it has been assumed that the vat is cylindrical. To show that the shape of these enclosures may be readily modified, a diagrammatic plan has been given, in Figure 4, of a different shape of execution in which the horizontal cross section of this enclosure is rectangular.

The introducer-mixer 30 may be of any suitable design.

However, the following arrangement is of advantage.

In a cylindrical casing, preferably fluted 56 (Figure 8) is arranged an Archimedean screw 55 set on a hollow shaft 54. This hollow shaft is mounted by means of a stuffing-box 59 in the extension of the liquid manure inlet 29 (Figure 3). Into the space contained between the worm screw and the casing 56 comes the material to be treated, contained in a tank or any feed arrangement 31 (Figure 3). At the end of the hollow spindle 54 there is a rotary blade 57 working together with a counterpart 57', similar to those of the meat-choppers; this chopper emerges in the intake of a centrifugal pump 58, driven for instance by a pulley 59 and that takes on the other hand the liquid decomposition product coming from the piping 29 after it has gone through the whole length of the hollow shaft 54. This pump achieves a close mixing of the liquid decomposition product and the minced material and sends it through the piping 33 to the lower portion of the vat 24 (Figure 3). A tap 52 enables the outflow of it to be regulated.

As it is known, more particularly through the works of Omelianski, of Winograski and of Deherain and through the Edelmist method, there is advantage to be gained in advancing the anaerobic fermentation intended to produce a good manure and to develop combustible gases, through a prior aerobic fermentation that more particularly undertakes to break up the varnishes, gums and sugars, that would embarrass the fermentation properly so called. This prior fermentation might take place in a pocket 61 (Figure 7) through which the air may travel easily by coming in through 61' and leaving through 61 and into which the wastes are stored during one or more days.

A suitable device such as a tap or swivelling nozzle 62 enables these wastes to be sown with suitable germs.

In the lower portion 63 of the pocket 61 is the mixing cylinder 56 previously disclosed or any other similar thing. In order that the prior fermentation stays properly aerobic the lower portion 63 of the pocket is provided preferably with an overflow 65, or similar, that cuts out continually the liquid manure poured into the pocket 61 and that is not removed by the mixer.

I claim:

1. An apparatus for the continuous fermentation of solid pulverized vegetable products to produce a fertilizer residue and fermentation combustion gas comprising in combination a mixing device for proportioning and mixing the fermentable vegetable products and liquid manure, an anaerobic fermentation vat, feeding means to supply the vegetable product liquid manure mixture from the mixing device into the lower portion of said fermentation vat, withdrawal means at the upper part of said fermentation vat located above the fermentation liquid level in said vat, an outlet pipe for removing the fermentation gas formed, and an evacuation chute for the fermented solid products, this latter fermented solid being displaced to the top of the fermenation vat by the upward force of the gas bubbles formed during the fermentation process.

2. An apparatus according to claim 1 in which the withdrawal means is located at the upper part of the vat and is provided with horizontal revolving paddles rotating about a substantially vertical axis for conducting the fermentation gases formed to the outlet pipe.

3. An apparatus as in claim 1 in which the fermentation vat is provided with circulating return pipes taking the liquid at the top level in said vat and returning it for recycling to the lower level of said vat.

4. An apparatus as in claim 1 wherein said fermentation vat is provided with an annular sheath substantially as high as the liquid in said vat and provided with perforations connecting the liquid drawn through said perforations to a return line for the recycling of the liquid from the top liquid level to return to the liquid at the bottom of said vat.

FRANÇOIS LAURENTY.

References Cited in the file of this patent

UNITED STATES PATENTS

| Number | Name | Date |
|---|---|---|
| 181,060 | Ellenberger | Aug. 15, 1876 |
| 350,472 | Baldwin | Oct. 12, 1886 |
| 672,996 | Woolner | Apr. 30, 1901 |
| 749,087 | Neubert et al. | Jan. 5, 1904 |
| 1,585,931 | Mabee | May 25, 1926 |
| 1,690,682 | Imhoff et al. | Nov. 6, 1928 |
| 2,338,228 | Boeckeler et al. | Jan. 4, 1944 |
| 2,345,814 | Harrison | Apr. 4, 1944 |